Patented Feb. 20, 1951

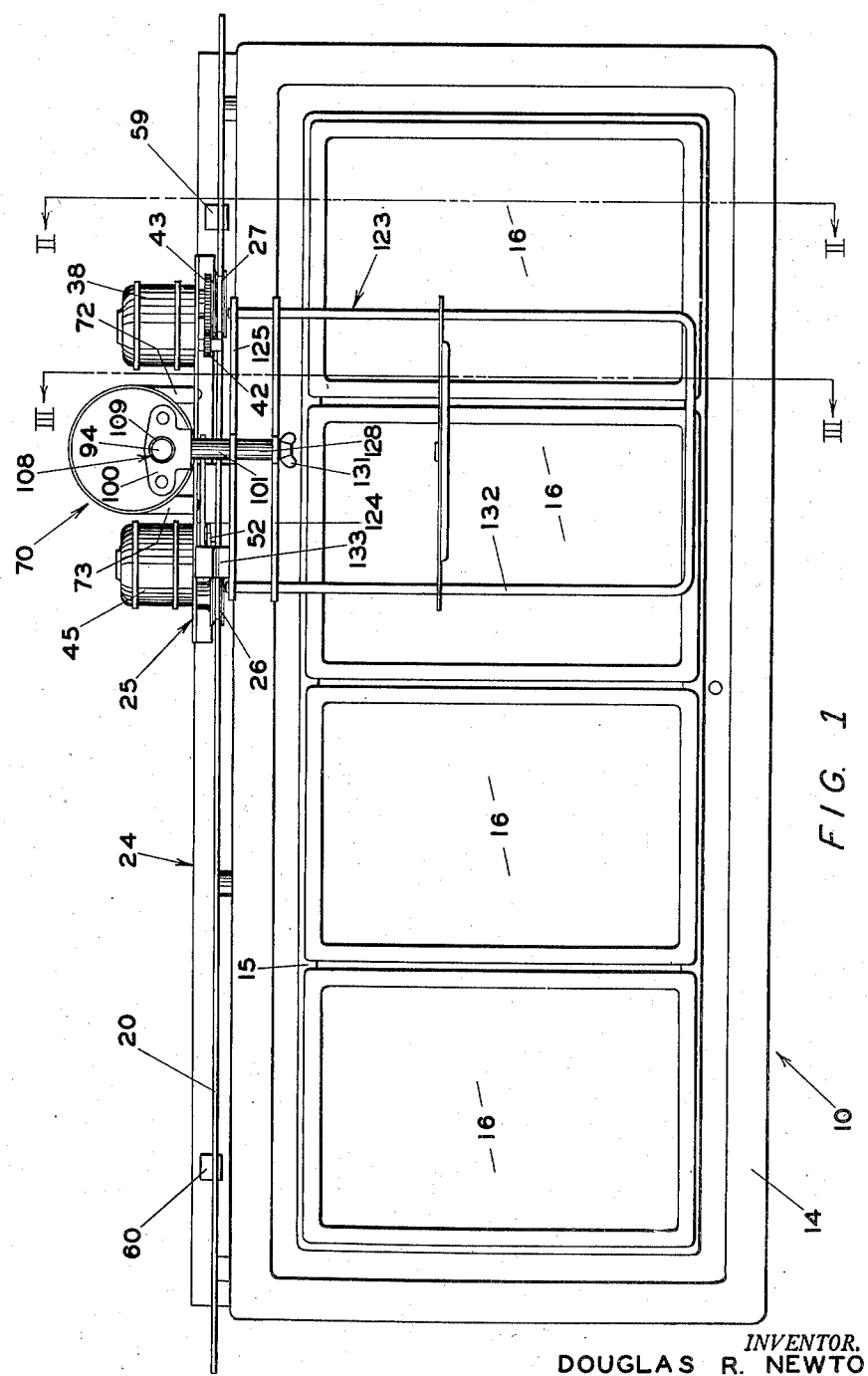

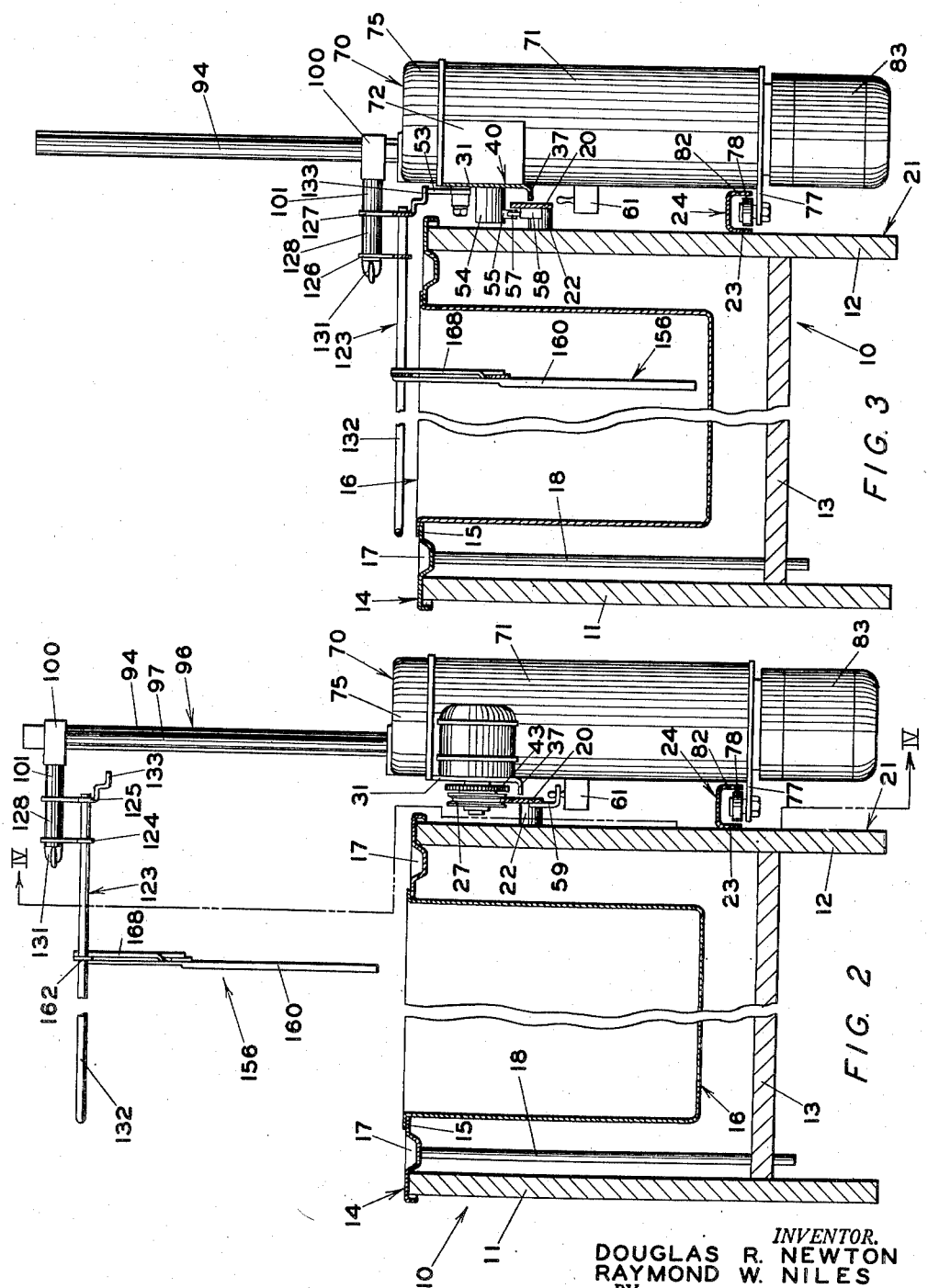

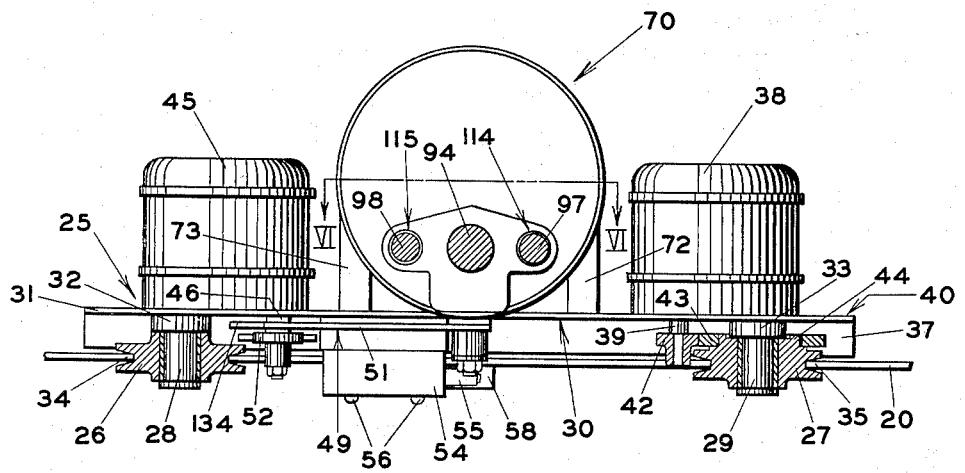
FIG. 5
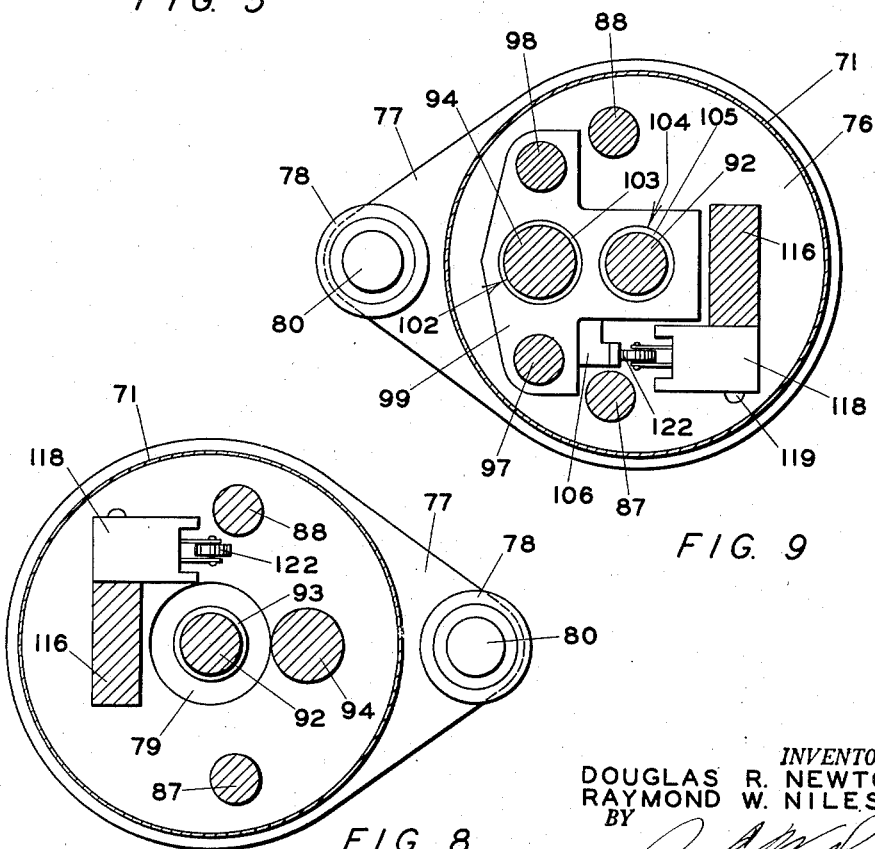
FIG. 9
FIG. 8
INVENTOR.
DOUGLAS R. NEWTON
RAYMOND W. NILES
BY
ATTORNEY

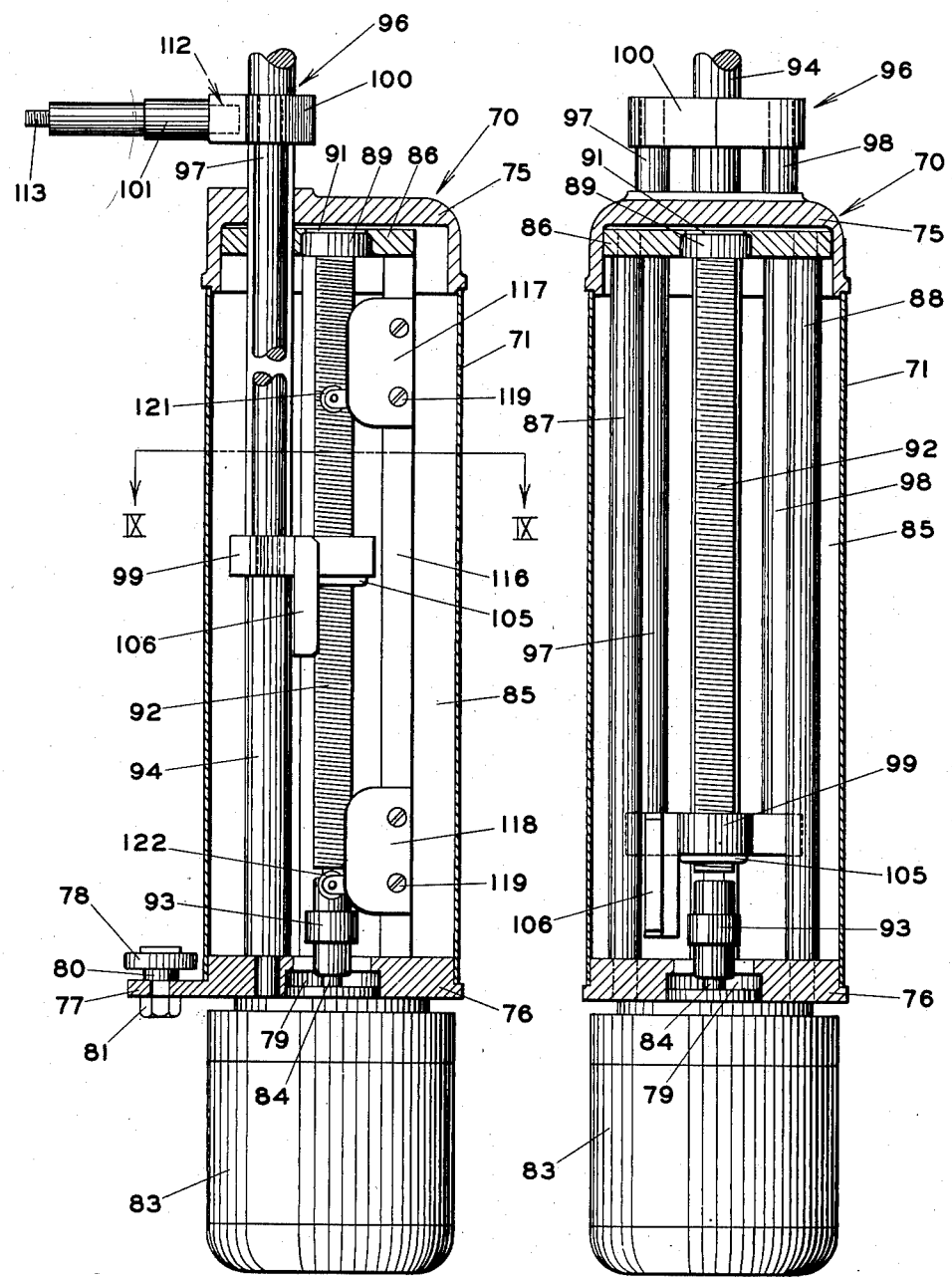

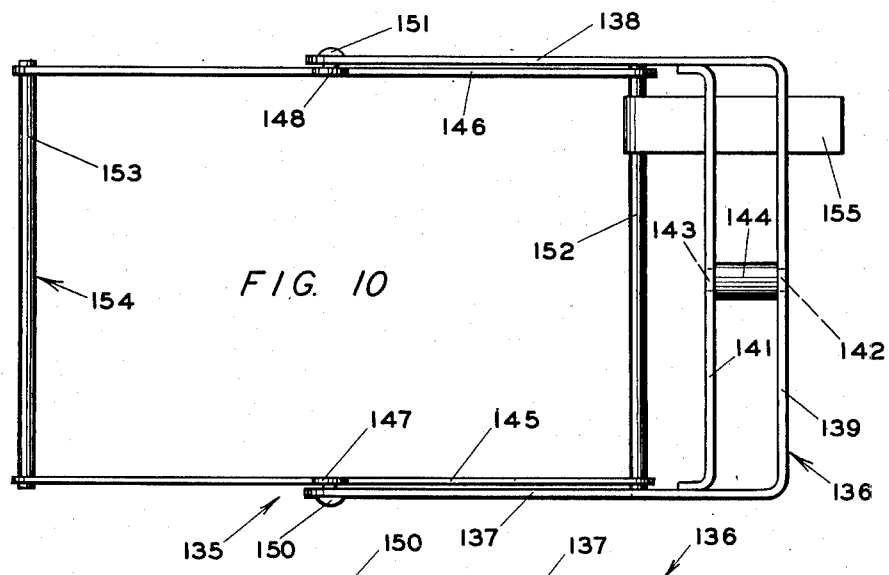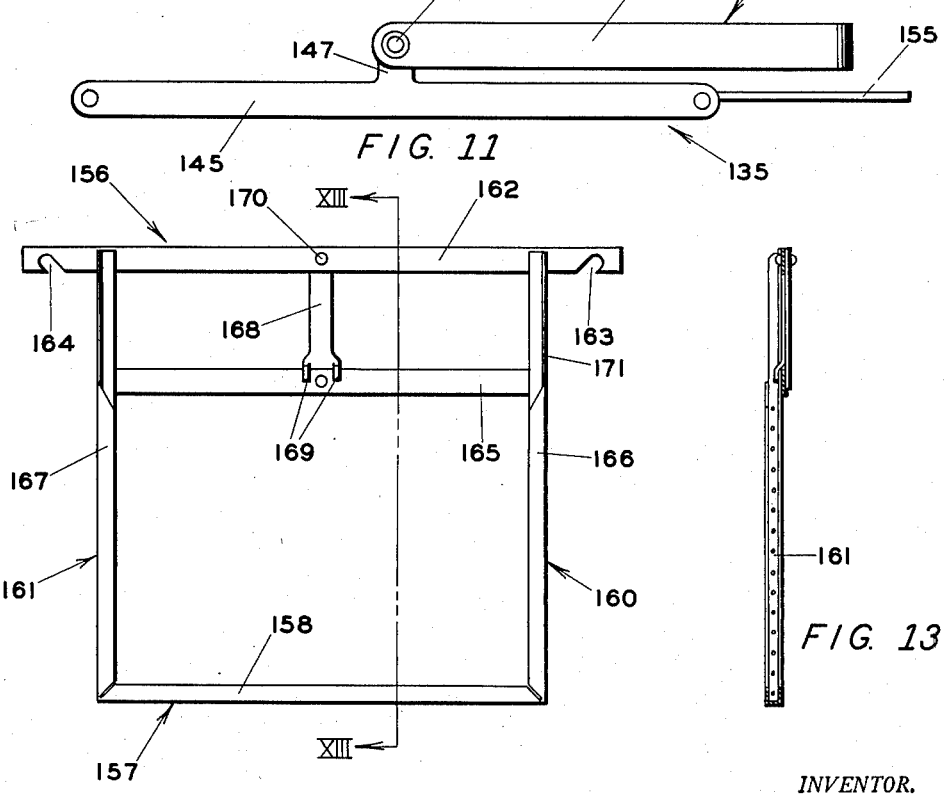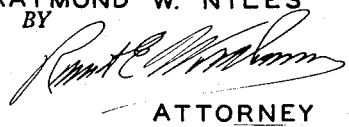

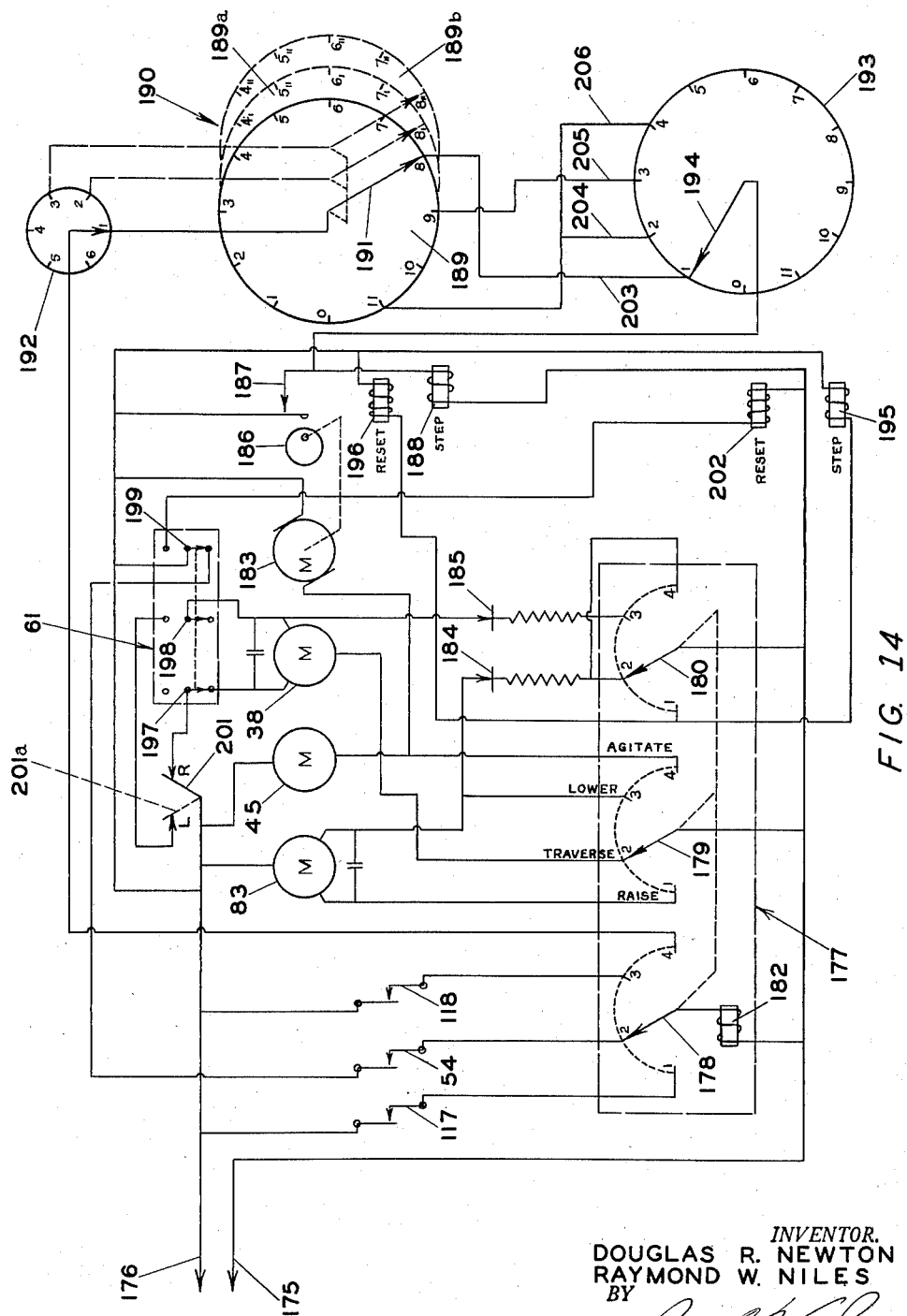

2,542,830

UNITED STATES PATENT OFFICE 2,542,830

AUTOMATIC PHOTOGRAPHIC PROCESSING DEVICE

Douglas R. Newton, Ann Arbor, and Raymond W. Niles, Saline, Mich.; said Niles assignor to said Newton Application February 20, 1948, Serial No. 9,878

6 Claims. (Cl. 95—89)

This invention relates to an automatic mechanism for developing sensitized photographic materials and particularly to a type thereof wherein the sensitized materials are carried from one processing station to the next on a self-propelled carriage whose movements are electrically controlled and timed.

It has long been recognized that certain improvements in the automatic photographic processing equipment known to exist are both desirable and advantageous. Many awkward, mechanical operations, now in existence, require elimination or improvement. An automatic, presettable, electrical timing device is needed for controlling the processing periods of sensitized materials, such as the immersion periods of the photographic plates. Further, an improved immersion mechanism is needed in order to substantially reduce the amount of liquid carried by present equipment from one tank to another tank, thereby reducing the contamination rate of a given tank of photographic chemicals.

Accordingly, a primary object of this invention is to provide an automatic, photographic processing device requiring a minimum of mechanical operations which are accurately and flexibly controlled by an electrical network.

A further object of this invention is to provide a photographic processing device, as aforesaid, having an electrical, presettable timer whereby the processing periods of the sensitized materials handled by said device may be automatically controlled.

A further object of this invention is to provide a photographic processing device, such as a developer, having an immersion mechanism whereby the contamination of the photographic chemicals, due to the carry over of liquids from one tank to the next by the sensitized materials and their support frames, is substantially reduced.

Other objects and purposes of this invention will become apparent to persons familiar with this type of equipment upon referring to the accompanying drawings and upon reading the following specification.

In order to meet the above mentioned objects and purposes, as well as others associated therewith and incidental thereto, we have provided a cabinet containing a series of aligned tanks, or other photographic processing stations, and a rail secured to said cabinet and parallel with said series of tanks, or stations. A wheeled carriage which is supported upon said rail, mounts a carriage driving motor, an agitation motor and a mechanism, including a motor, for raising and lowering sensitized materials which materials are suspended by said mechanism over said tanks. An electrical network, by means of which the movements of said carriage are substantially controlled, is operatively associated with an instrument and control panel from which an operator may conveniently control the processing steps.

For a particular preferred embodiment of the invention, attention is directed to the accompanying drawings in which:

Figure 1 is a top plan view of the automatic, photographic processing device to which this invention relates.

Figure 2 is a broken sectional view of Figure 1 taken along the line II—II.

Figure 3 is a broken sectional view of Figure 1 taken along the line III—III, and showing the sensitized material support frame in the immersion position.

Figure 5 is a sectional view of Figure 4 taken along the line V—V and also showing the carriage support wheels in central cross section.

Figure 6 is a sectional view of Figure 5 taken along the line VI—VI.

Figure 7 is a side elevation view of the sensitized material raising and lowering mechanism with its housing shown in central cross section.

Figure 8 is a sectional view of Figure 4 taken along the line VIII—VIII.

Figure 9 is a sectional view of Figure 7 taken along the line IX—IX.

Figure 10 is a top plan view of an alternate sensitized materials support frame.

Figure 11 is a side elevation view of said alternate sensitized materials support frame.

Figure 12 is a side elevation view of a photographic film hanger.

Figure 13 is a sectional view of Figure 12 taken along the line XIII—XIII.

Figure 14 is a schematic wiring diagram of the electrical network.

Cabinet and tanks

Figure 4:
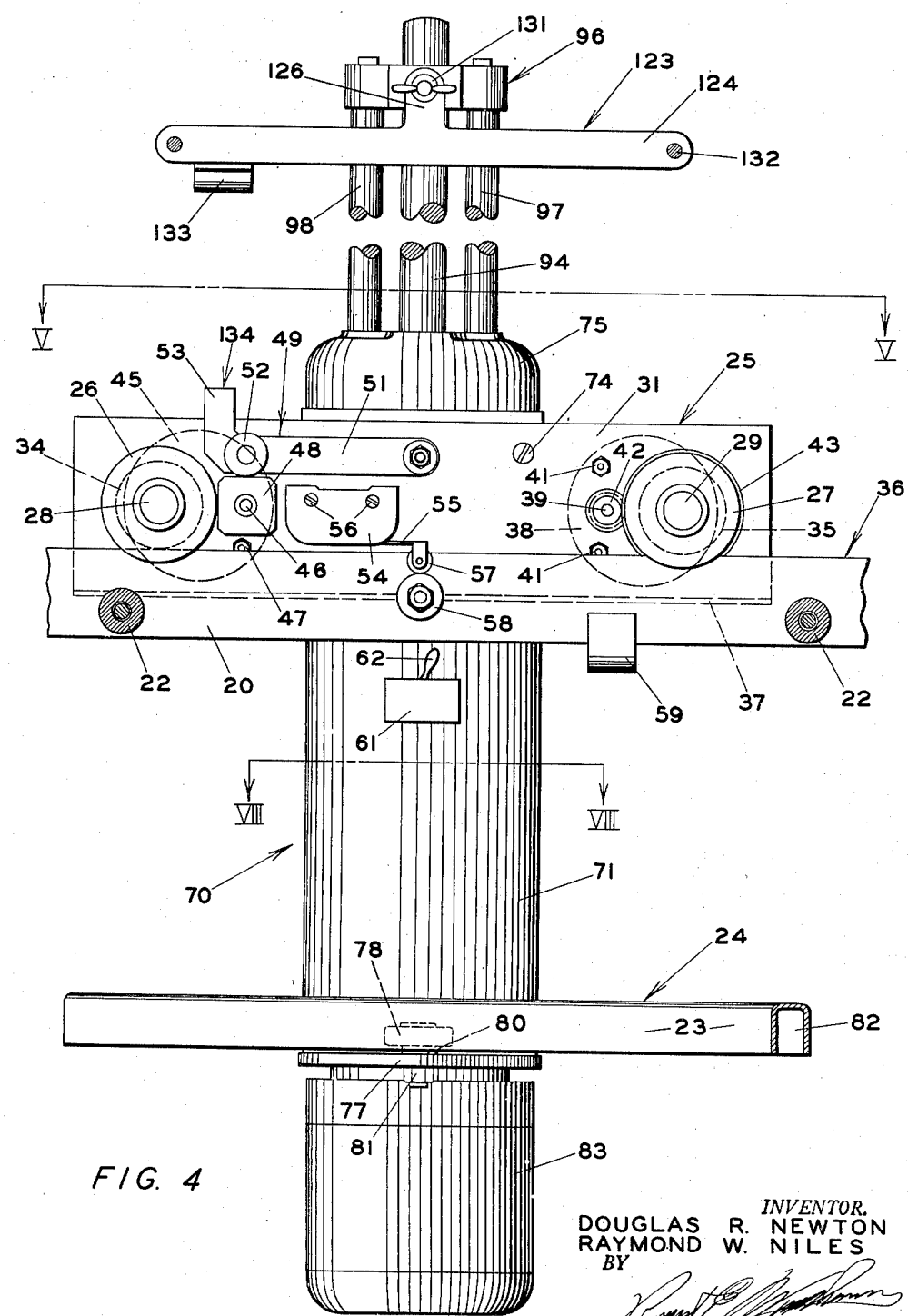
Figure 4 is a broken, sectional view of Figure 2 taken along the line IV—IV.

The automatic photographic processing device to which this invention relates has a cabinet 10, as illustrated in Figures 1, 2 and 3, which may be fabricated from wood, metal, or any other suitable material. Said cabinet will be hereinafter referred to for convenience as a "tank cabinet" although other means for effecting photographic processes will be contained therewithin. It has an outer sidewall 11, an inner sidewall 12 and a bottom 13 which may be secured to each other in any convenient, conventional manner appropriate to the material used in said cabinet. The upper edges of said sidewalls 11 and 12, as well as the upper edges of the end walls, not shown, lie within a single plane and are covered with cabinet rim 14 which completely encircles the top of said cabinet 10. Said rim 14, which is preferably fabricated from stainless steel or other non-corrosive material, extends horizontally towards the center of said cabinet to form a support shelf 15 within the sidewalls and end walls of said cabinet 10 upon which a plurality of individual tanks 16 may be supported.

Between said support shelf 15 of said rim 14 and the sidewalls or end walls of said cabinet 10 there is in said rim 14 a drip trough 17 having a drain 18. Said trough 17 strengthens said rim 14 and catches the liquids dripping from the photographic materials as they are carried from one of said tanks 16 to another.

The tanks 16 are preferably fabricated from a non-corrosive material such as stainless steel and are equal in width. Their lengths and depths, however, may be varied as desired or required. As shown in Figures 1 and 2, it is assumed, for illustrative purposes only, that the tanks 16 are identical in length, width and depth in this embodiment of the invention. Of course, it will be understood that within the scope of this invention, one or more of the tanks 16 may be replaced by equipment adapted for other operations, such as "second exposure" or drying. For convenience, however, reference hereinafter will usually be made to "tanks" only but such reference will be understood to include any processing station usual in photographic technique.

A carriage rail 20 is secured to and spaced from the outer surface 21 of said cabinet inner side wall 12 by means of a plurality of carriage rail spacers 22. The carriage rail 20 which is parallel with and near to the upper edge of said inner side wall 12, extends slightly beyond both longitudinal ends of said cabinet.

The flange 23 of an inverted guide channel 24, which channel may be fabricated from a suitable sheet material such as steel, is secured in any convenient, appropriate manner to the outer surface 21 of the cabinet inner side wall 12. The guide channel 24 is parallel with and spaced below the carriage rail 20.

The carriage

A wheeled carriage 25 is supported upon the carriage rail 20 by means of the carriage wheel 26 and the carriage driving wheel 27, Figures 4 and 5. The said wheels 26 and 27 are rotatably supported upon the shafts 28 and 29, respectively, which shafts are held, as by bolting, to the inner side 30 of the carriage back plate 31, intermediate its upper and lower, parallel, longitudinal edges. A pair of collars 32 and 33 space said wheels 26 and 27, respectively, from said carriage back plate inner side 30. The carriage wheels 26 and 27 each have a groove 34 and 35, respectively, into which the carriage rail upper edge 36 is operatively received.

The lower edge of said carriage back plate 31 has a flange 37 which is opposite and parallel with said carriage rail 20. A carriage driving motor 38 (Figures 1 and 5), whose driving shaft 39 extends through a suitable opening in said carriage back plate 31, is secured to the outer side 40 of said back plate 31 near one end thereof, and approximately in line with said driving wheel 27 by any suitable means such as the studs and nuts 41. A driving gear pinion 42, rotatable with the extended end of the driving shaft 39 of said carriage motor 38, is secured to said shaft 39. This driving pinion 42 operatively engages and drives a driven gear 43 which is mounted upon and secured to the hub 44 of the driving wheel 27.

The said carriage motor 38 may be any convenient, appropriate type whose direction of rotation can be reversed. The gear pinion 42 may be secured to the shaft 39, and the carriage wheels 26 and 27 may be rotatably retained upon the shafts 28 and 29, respectively, in any suitable manner.

An electric agitation motor 45, whose driving shaft 46 extends through a suitable opening in said carriage back plate 31, is secured to said back plate outer side 40, remote from said carriage motor 38, by any appropriate means such as the studs and nuts 47. An agitation cam 48, rotatable with the driving shaft 46, is secured by any convenient means, such as set screws, to the driving shaft 46. Said cam may be of any appropriate shape and diameter but is herein disclosed as square with the corners trimmed off. The agitation motor 45 is preferably a slow speed motor.

An agitation bar 49, which is L-shaped and advantageously fabricated from a substantially rigid material, such as steel plate or bar, is pivotally secured at the free end of its horizontal arm 51 to the inner side 30 of said back plate 31 approximately intermediate its longitudinal extremities. A cam roller 52 is rotatably mounted upon said agitation bar 49 at approximately the junction point between said horizontal arm 51 and the vertical arm 53. The horizontal arm 51 of the agitation bar 49 is of such length and is so positioned that the cam roller 52, mounted thereon, is above and is operatively engaged by the agitation cam 48.

An electrical switch 54, having a tripping arm 55, is attached to the carriage back plate inner side 30 by means such as the screws 56. The free end of said tripping arm 55 rotatably supports a contact roller 57 which successively engages a plurality of stop blocks 58. Said blocks 58 are preferably mounted, by means such as bolting, on that side of said carriage rail 20 adjacent to said cabinet inner sidewall 12, and are so positioned that the contact roller 57 can engage them without interference with the carriage rail spacers 22.

A pair of switch actuation bars 59 and 60 are secured to said carriage rail 20 at the opposite extremities thereof (Figures 1 and 2). A mechanically actuated double throw, three pole switch 61 is mounted upon that side of the elevator casing 71 adjacent to said cabinet inner side wall 12 by any suitable means such as bolting. The said switch toggle 62 is mechanically tripped by said actuation bars 59 and 60, respectively, when the wheeled carriage 25 reaches either end of said carriage rail 20.

The elevator

An elevator 70, illustrated in Figures 1 to 9, inclusive, and having a vertically disposed, cylindrical elevator casing 71, is secured, near the upper end of said casing, against the carriage back plate outer side 40, between said motors 38 and 45, by means of a pair of elevator support brackets 72 and 73. Said brackets 72 and 73 are affixed, such as by bolting, to the said casing 71, one on each side, and are attached to said back plate 31 by means of the bracket bolts 74. Said casing 71 may be fabricated from a suitable sheet metal such as steel or aluminum.

The upper edge of the casing 71 is engaged by an elevator dome 75, and the lower end of said casing is secured, as by bolting, to the elevator base plate 76. The dome 75 and the base plate 76 may be cast and/or machined from a suitable metal such as iron, steel or aluminum.

The base plate 76 has an integral flange 77 which extends towards the cabinet inner side wall 12 and upon which a guide roller 78 is rotatably mounted. The vertical shaft 80, upon which the guide roller 78 rotates, is secured to the flange 77 by means of the bolt 81. Said guide roller 78 is operably held between the downwardly extending flanges 23 and 82 of the guide channel 24, thereby preventing any appreciable movement of the lower end of the elevator 70 in a direction perpendicular to the cabinet inner side wall 12 or to the channel 24 (Figures 2, 3, 4 and 7).

An electric elevator motor 83, of reversible type and having a vertical elevator motor shaft 84, is secured to, and is suspended below, the elevator base plate 76 by any suitable means such as bolts, not shown, so that the shaft 84 extends through an opening 79 in said base plate 76.

The elevator dome 75, the elevator casing 71 and the elevator base plate 76 define the cylindrical, vertical elevator inner chamber 85. An elevator screw bearing plate 86, which may be fabricated from steel plate, is held in a horizontal position at the extreme upper end of the inner chamber 85 by means of a pair of bearing plate support rods 87 and 88. These support rods 87 and 88 are rigidly secured to the bearing plate 86 and the base plate 76 by any appropriate means, such as having their extremities press fitted into openings in said plates 86 and 76, respectively. An appropriate elevator screw bearing 89 is fixed within a suitable opening 91 in the bearing plate 86.

A vertical elevator screw 92 is rotatably retained at its upper extremity within the elevator screw bearing 89 and at its lower end it is supported upon one side of a flexible coupling 93. The other side of the coupling 93 is secured to said elevator motor shaft 84. The elevator screw 92 is preferably, but not necessarily, coaxial with the elevator inner chamber 85, and it is positioned approximately midway between the bearing plate support rods 87 and 88.

The lower end of a vertical elevator rack guide rod 94, which extends through an opening in the elevator dome 75 and the elevator screw bearing plate 86, is rigidly secured to the base plate 76 as by being pressed into a suitable opening therein. The guide rod is preferably positioned approximately equidistant from the bearing plate support rods 87 and 88 on the tank cabinet side of the elevator screw, and spaced therefrom.

The elevator rack 96, comprising a pair of vertical rack rods 97 and 98, a rack lower plate 99, a rack upper plate 100 and a frame support rod 101, is slidably supported and guided upon the guide rod 94 as the rack is moved, upwardly or downwardly, by the elevator screw 92. The rack rods 97 and 98, which are on opposite sides of, and preferably equidistant from, the guide rod 94, are secured at their corresponding extremities to the lower plate 99 and the upper plate 100 in any suitable manner, such as by being inserted into suitable openings in the plate 99 and the plate 100 and held therein.

The rack lower plate 99 (Figures 6, 7 and 9), which is substantially T-shaped, has an opening 102 provided with a suitable bushing 103 through which the guide rod 94 is slidably received. The flange portion of said T-shaped lower plate 99 is engaged by the lower ends of the rack rods 97 and 98 on opposite sides of the bushed opening 102. An opening 104 in the stem portion of the T-shaped lower plate 99 is provided with a threaded sleeve 105 which engages the elevator screw 92. The rack lower plate 99, hence the entire elevator rack 96, is dependent upon this elevator screw 92 for reciprocable support in a vertical direction.

A contact runner 106 (Figures 7 and 9) is secured to the T-shaped lower plate 99, as by welding or by screws, against and between the stem portion and said flange portion.

The rack upper plate 100 (Figures 1, 6 and 7), which is also substantially T-shaped, has an opening 108 provided with a suitable bushing 109 through which the guide rod 94 is slidably received. The flange portion of the T-shaped upper plate 100 is engaged by the upper ends of the rack rods 97 and 98 on opposite sides of the bushed opening 108. A horizontal opening 112 in the end of the stem portion of the T-shaped upper plate 100 is provided to receive one end of the frame support rod 101. The rod 101, which is substantially perpendicular to said guide rod 94 and to the plane of the cabinet side wall outer surface 21, is threaded at its extended end 113.

The vertical rack rods 97 and 98 are slidably received through the openings 114 and 115 (Figure 5) in the elevator dome 75 and through corresponding openings in the elevator screw bearing plate 86. The guide rod 94, the vertical rack rods 97 and 98, the bearing plate support rods 87 and 88, the elevator screw 92 and the switch supporting bar 116 are all substantially parallel with each other as well as with the vertical axis of the elevator inner chamber 85.

The electrical switches 117 and 118, which may be similar to the switch 54, are secured to the switch supporting bar 116 by any convenient means such as the screws 119. The contact rollers 121 and 122 extend from the switches 117 and 118, respectively, so that they may be engaged by the contact runner 106 (Figures 7 and 9). Said switches 117 and 118 may be placed along the switch supporting bar 116 as desired or required.

In this particular embodiment of the invention, a clockwise rotation of the elevator screw 92, as appearing from the lower end thereof, will effect a raising of the elevator rack 96 and a counterclockwise rotation of said screw 92 will lower said rack.

The support frame

As illustrated in Figures 1, 2, 3 and 4, a sensitized material support frame 123 is removably supported upon said frame support rod 101. Such support frame 123 has a pair of similar, flat, parallel support bars 124 and 125 which have integral tongues 126 and 127, respectively, extending from one edge of each, midway between their longitudinal extremities. Said tongues 126 and 127 have suitable openings, connected by a sleeve 128, through which the frame support rod 101 is slidably received. A wing nut 131, which engages the threaded end 113 of said support rod 101, prevents the accidental removal of the support frame from the support rod but permits the support frame to rotate or oscillate upon the rod 101. Said support bars 124 and 125 depend below the tongues 126 and 127 when in operative position.

A U-shaped metal rod 132, which is received through corresponding openings near the ends of said support bars 124 and 125, is secured thereto, as by welding and supported thereby in a horizontal position. As shown in Figure 1, the area enclosed by the metal rod 132 and the support bar 124 is about the same as the area of the top of a tank 16. Said support frame is positioned and constructed so that it extends over the full width of the tank area of said cabinet 10. The support frame 123 is so affixed that it will remain in a substantially horizontal position even while unloaded.

A contacting finger 133, which is integral with or secured to the brace bar 125, is so positioned thereon that it may be engaged by the upper end 134 of the vertical arm 53 of the agitation bar 49, when the support frame 123 is in a lowered position, as shown in Figures 1 and 3.

Figures 10 and 11 illustrate an alternate sensitized material support frame 135, having a U-shaped support bracket 136. Said bracket 136, which may be fabricated from a strip of metal such as stainless steel, has a pair of support arms 137 and 138 which extend from and are integral with a base bar 139. A flat brace bar 141, which is parallel to and spaced from the base bar 139, is secured at its longitudinal extremities to the support arms 137 and 138, as by welding. A pair of openings 142 and 143 are provided in the base bar 139 and the brace bar 141, intermediate their ends, said openings being aligned and connected by a sleeve 144. The frame support rod 101 is slidably received through the openings 142 and 143 after which the wing nut 131 may be placed on the threaded end 113 of the support rod 101 to prevent the alternate support frame 135 from being accidentally removed therefrom.

A pair of flat, elongated, parallel support bars 145 and 146 are pivotally engaged by and supported upon the free ends of the support arms 137 and 138 of the support bracket 136. Each support bar 145 and 146, has an integral support tongue 147 and 148, respectively, which extends perpendicularly from the edge of the support bar intermediate its extremities. The support bars 145 and 146 are suspended from the support arms 137 and 138 by means of the support tongues 147 and 148, whose free ends are pivotally secured, as by means of the cradle pins 150 and 151, to the support arms. A pair of parallel cross rods 152 and 153 are rigidly secured at their extremities in any convenient conventional manner to the corresponding ends of the support bars 145 and 146.

The support bars 145 and 146 and the cross rods 152 and 153 comprise a cradle 154 which is free to rock on the cradle pins 150 and 151 between the arms 137 and 138.

The contacting finger 155, which is either integral with or attached to the cross rod 152 of the cradle 154 is positioned thereon and extends therefrom so that it may be engaged by the upper end 134 of the vertical arm 53 of the agitation bar 49.

The support frame 123 is designed to support small photographic film hangers whereas the alternate support frame 135 is designed to support larger photographic film hangers, such as the film hanger 156.

The photographic film hanger 156, appearing in Figures 2, 3, 12 and 13, is comprised of a U-shaped channel 157 having a base channel 158 and a pair of channel arms 160 and 161 which extend perpendicularly from the base channel. Said channel arms, which are substantially parallel and equal in length, are secured, as by spot welding, at their free extremities to a flat hanger bar 162.

The ends of said hanger bar 162, which extend beyond the junction points with said channel arms 160 and 161, are provided with slotted recesses 163 and 164 in the lower edge of the hanger bar 162. Said recesses, which are cut into the hanger bar 162, are preferably just large enough to receive the U-shaped rod 132 of the support frame 123 or the cross rods 152 and 153 of the alternate support frame 135.

A brace bar 165, which is parallel with and spaced from the hanger bar 162, is secured, as by spot welding, at its extremities to the channel arms 160 and 161 intermediate their extremities. The upper portions of the outer flanges 166 and 167 of said channel arms 160 and 161, respectively, are removed down to the points where the brace bar 165 engages said arms.

A gripping arm 168, which is pivotally secured, as by means of the pivot pin 170, at its one extremity to the center of the hanger bar 162, is provided with fingers 169 at its other end, which fingers overlap the brace bar 165, when the gripping arm 168 is substantially perpendicular thereto. The channel web 171 of the entire U-shaped channel 158 is perforated with a plurality of openings, through which fluids are permitted to escape freely.

The electrical network

In order to facilitate the disclosure of the invention, herein described, the entire electrical circuit has been schematically shown in Figure 14 and substantially all references to wiring have been omitted from the remainder of the figures. It will be understood that unless otherwise stated to the contrary, all wiring is accomplished in any conventional manner, and all electrical relays, switches and fixtures are of a conventional type which may be obtained as standard electrical equipment. Hence, description will proceed largely in terms of function, it being understood that excepting as otherwise stated any standard equipment may be used to effect the operations described.

The circuit is energized, preferably with 110 volt 60 cycle alternating current, through the leads 175 and 176 which will hereinafter for convenience be referred to as the hot lead 175 and the return lead 176. There is a three deck stepping relay 177 whose three decks 178, 179 and 180 are mechanically interconnected so that they rotate together. The first relay deck 178 sequences the stepping coil 182 of said relay 177. The second relay deck 179 controls the energizing of the elevator motor 83, the agitation motor 45, the carriage driving motor 38 and the timing motor 183. The third relay deck 180 controls the application of direct current to the stators of said motors 83 and 38 for the purpose of dynamic braking. To effect these purposes each deck of the relay 177 has four positions numbered from one through four which are contacted successively by simultaneously operating electrically conductive arms pivotally mounted in any suitable way for uniform stepwise movement from one position to the next by successive impulses from the step coil 182.

The timing motor 183 is mechanically coupled with an appropriate, conventional timing cam 186 for rotation therewith at a uniform rate of speed thus intermittently to actuate a timing switch 187. Said timing switch 187 when closed completes the circuit through the step coil 188 of the multi-deck stepping relay 190. Each closing of the switch 187 moves the timing arm 191 of said relay 190 from one position to the next. Although eleven such positions are shown in this illustration, any number may be used without departing from the scope of the invention.

The relay 190 may have any number of relay decks 189, but preferably has about five or six decks. Each deck provides a complete and independent timing program for the operation of the wheeled carriage 25 and its attachments with respect to the tank cabinet 10 (Fig. 1). The desired deck 189, or program, is selected by the selector switch 192, which is electrically connected to the various relay decks 189 in said relay 190. There are at least as many positions (six in this embodiment), around this selector switch 192 as there are programs, or decks 189 in the relay 190. For illustrative purposes, only, the relay 190 is herein shown as having three decks 189, 189a and 189b. The several electrically conductive timing arms 191, of which there is one for each deck, preferably sweep simultaneously all of the respective relay decks 189, 189a and 189b. Thus, with all of the arms 191 initially at the first position, the first actuation of the step coil 188 will move all of the arms to the second position on each of their respective decks, the next actuation of the coil 188 will move them all to the third position and so on around the several decks indefinitely so long as the step coil operates.

The single deck step relay 193 which is in the same circuit with the multi-deck step relay 190 has a tank indicator arm 194. This arm sweeps over, and makes electrical connection with, a plurality of position contacts which are at least equivalent to the number of tanks, or other processing stations, along the tank cabinet 10. Each deck 189 of said multi-deck relay 190 is electrically connected to each position on the single deck relay 193 for which there is a tank and/or operation along the tank cabinet 10. Hence, if there are four tanks, as illustratively shown in Figure 1, normally there are four electrical leads between each deck 189 and the first four positions on the relay 193. The first deck 189 is shown in Figure 14 connected to the first four positions on the relay 193 by means of the lead wires 203, 204, 205 and 206, respectively. Other decks, representing other programs, will be similarly connected but such connections are not here shown since they would merely complicate the drawing and not improve the disclosure. It will be understood that variations may be made in this timing mechanism without departing from the scope of the invention. For example, substantially the same selection effect may be obtained if relay 190 is a single deck relay and relay 193 is multi-deck with the selector switch 192 connected to relay 193.

The step coil 195 of the step relay 193 and the reset coil 196 of the multi-deck step relay 190 are in parallel circuits which circuits meet at the first position on the third deck 180 of the relay 177.

The double throw, three-pole, switch 61 is mechanically actuated by the switch actuation bars 59 and 60 which are mounted at, and upon, the extremities of said carriage rail 20 (Figure 1). The two poles 197 and 198 of said switch 61 are connected through the two position toggle switch 201 to two terminals of said carriage motor 38. Hence, the position of the switches 201 and 61 controls the direction of rotation of the motor 38. The third pole 199 of the switch 61, when in one position, closes the circuit which includes the switch 54, the second position on the first deck 178 of the step relay 177 and step coil 182. When said third pole 199 is in the other position, it opens the above mentioned circuit and closes the circuit including the reset coil 202 of the relay 193.

The numerals 184 and 185 indicate rectifiers for supplying direct current, regulated by suitable associated resistances, for the braking of the motors 38 and 83 as hereinafter described.

The several parts thus described are connected as shown in the diagram of Figure 14 for operation as described below.

*Operation*

As hereinbefore mentioned, it will be assumed for illustrative purposes that the tank cabinet 10 contains the four tanks often used in photographic development which contain, in order: a developing solution, a wash bath, a fixing solution and another wash bath. Either the sensitized materials support frame 123 or the alternate support frame 135, whichever is selected for use, will be secured to and supported upon the frame support rod 101 of the elevator rack 96. The wheeled carriage 25 and its various attachments are then moved to the leftward end of the tank cabinet 10, as appearing in Figure 1, and the support frame (123 in this illustration) is ready for loading. It will be understood that said carriage may be arranged to move either from left to right or from right to left, as appearing in Figure 1, without going beyond the scope of this invention.

The sensitized sheets to be developed are inserted within the photographic film hangers 156 and held therein by means of the fingers 169 on the gripping arm 168. If, as aforesaid, the support frame 123 is used, the plate hangers 156 are hung on the U-shaped metal rod 132, thereof, so that the slotted recesses 163 and 164 in the hanger bar 162 will engage the opposing sides of said rod 132.

While the support frame 123 is being loaded, the elevator rack 96 is in the raised position as appearing in Figure 2 and the individual contact arms of the decks 178, 179 and 180 of the three deck step relay 177 are on position two of each deck, respectively. The three-pole switch 61 is in the downward position, as shown in Figure 14, and the toggle switch 201 is in the dotted line position 201a, marked "L." The switch 54 is open because its contact roller 57 is not being engaged by any stop block 58. The energizing circuits to each of the four motors 83, 45, 38 and 183 are open, and will remain open until the switch 201 is moved rightwardly. The multi-deck relay 190 is at the zero position and the tank indicator arm 194 of the single deck relay 193 is also pointing to the zero position. The circuits to the step and reset coils 196, 188, 202 and 195 are open.

It will be assumed, for illustrative purposes only, that the selector switch 192 is set to select the first deck 189 and its program on the multi-deck relay 190. It will be further assumed that said first deck 189 is electrically connected to said single deck relay 193 as appearing in Figure 14 and as hereinafter described in detail. The leads 175 and 176 are connected, by way of example, to a source of 110 volt, 60 cycle, alternating current.

When the said support frame 123 has been loaded, the wheeled carriage 25 and the mechanisms associated therewith and supported thereby are set into operation by moving the toggle switch 201 rightwardly to the position marked "R," as appearing in Figure 14. This closes the circuit including the three-pole switch 61, the carriage driving motor 38 and the position two on the relay deck 179 of the relay 177. The motor 38 moves the carriage 25 along the rail 20 until the roller 57 of the switch 54 engages a stop block 58, secured to the rail 20, thereby closing the switch 54.

Immediately upon the closure of the switch 54, the circuit including said switch 54, position two on the relay deck 178 of the relay 177 and the step coil 182 is closed, thereby actuating the step coil 182 which causes all three decks of the relay 177 to advance to position three.

With the relay 177 in position three, the rectifier 185 is energized by the deck 180, thereby producing a direct current through the stator of the motor 38 which dynamically brakes the rotor thereof. Such braking prevents over-travel of the wheeled carriage 25 with respect to the selected position along the tank cabinet 10 determined by this first stop block 58. At the same time, the elevator motor 83 is energized, through the deck 179 of said relay 177, so that the elevator rack 96, and parts supported thereon, are lowered. The rack 96 moves downwardly until the contact runner 106, secured to the lower plate 99 of said rack 96, engages the contact roller 122 of the electrical switch 118 and closes said switch. The rack 96 is now in the lowered position.

The closure of the switch 118 completes the circuit including position three on the deck 178 of the relay 177 and the step coil 182, thereby advancing the relay 177 to position four on all decks. The rectifier 184, which is in the circuit with position four on the deck 180 of the relay 177 is now energized and supplies direct current to the stator of the elevator motor 83 thereby dynamically braking its rotor and holding it firmly with the elevator rack in the lowered position.

Position four on the deck 179 of said relay 177 completes the circuit including the agitation motor 45, which motor begins to rotate at once, thereby driving the agitation cam 46 (Figures 3, 4 and 5). The cam 46, which may be rotated at any desired speed, effects an upward movement of the agitation bar 49 through the cam roller 52. Said bar 49 is urged downwardly by gravity which results in a vertical reciprocation of the free end. The vertical arm upper end 134 of said bar 49 bears against the contacting finger 133 of the sensitized materials support frame 123 when the elevator rack 96 is in the lowered position. Thus, the upward and downward movement of said bar 49 causes the support frame 123 to rock, or oscillate, upon the axis of the frame support rod 101. This oscillation effects a continuous motion of the sensitized materials supported upon the support frame 123, which motion is desirable in the correct and speedy processing of photographically sensitized materials.

If the alternate support frame 135 (Figures 10 and 11) is used in place of the support frame 123, then the vertical arm upper end 134 of the agitation bar 49 engages the contacting finger 155, which finger is secured to the cross rod 152 of the cradle 154. Thus, an upward and downward movement of said bar 49 causes the cradle to rock or oscillate upon the axes of the cradle pins 150 and 151. This oscillation effects a continuous motion of the sensitized materials supported upon said cradle 154.

Position four on the deck 179 of the relay 177 also completes the circuit including the timing motor 183, which motor drives a timing cam 186 at a constant speed. In this particular embodiment of the invention, each rotation of the cam 186 effects a closure of the timing switch 187 and each such closure energizes the step coil 188 of the multi-deck relay 190. With each actuation of the step coil 188, the timing arm 191 advances one position around the decks 189, 189a and 189b of the said relay 190.

The deck 189, which, for illustrative purposes, is selected by the selector switch 192 as providing the desired operational program for the particular processing desired, is electrically connected to the first four positions of the relay 193 by means of the leads 203, 204, 205 and 206, respectively. Inasmuch as the wheeled carriage 25 is now positioned adjacent to the first tank in the tank cabinet 10, as aforesaid, the tank indicator arm 194 rests on position one on said relay 193. Therefore, when the timing arm 191, by the stepwise advancement above described, reaches position eight on the relay 190, the circuit, including the step coil 182 and the position four on the deck 178 of the relay 177, the selector switch 192, the deck 189 of the relay 190, the lead 203, the relay 193 and the timing switch 187, is completed except for the closure of said switch 187. However, since the timing motor 183 is still being energized, said switch 187 is closed with the next rotation of the cam 186 and current flows through the entire last mentioned circuit, and the step coil 182 advances the relay 177 to position one on each deck. The circuit has been designed so that it will be closed by terminals on the switch 187, which have greater electrical capacity than the terminals on the relay 190, thereby reducing pitting of these relay terminals by make-contact arcing thereon.

With the advancement of the relay 177 to position one, the agitation motor 45 and the timing motor 183 are disconnected. The elevator motor 83 is energized, through a circuit including position one of the deck 179 of the relay 177, so that the elevator rack 96 is raised by the screw 92. At the same time, a reset coil 196 which is in series connection with position one on the deck 180 of said relay 177 is actuated and resets the timing arm 191 of the multi-deck relay 190 at the zero position. A step coil 195, which is also in a series circuit with position one of said deck 180 and in parallel circuit with said reset coil 196, advances the tank selector arm 194 from position one to position two, which new position represents the next tank 16 along the tank cabinet 10.

When the contact runner 106, which is attached as aforesaid to the bottom of the elevator rack 96, engages the contact roller 121 and thereby closes the switch 117 (Figure 7), the step coil 182, which is in a circuit with said switch 117 through position one on the deck 178 of the relay 177, is actuated and the relay 177 is advanced to position two.

With the relay 177 on position two, the rotor of the elevator motor 83 is dynamically braked at once by direct current supplied to the stator of said motor through position two on the deck 180 of the relay 177 and the rectifier 184. The carriage driving motor 38 is energized through position two on the deck 179 and the wheeled carriage is moved towards the next tank 16, or other operative station, along the tank cabinet 10.

This completes one complete unit cycle and the next cycle commences as soon as the roller 57 engages the next stop block. This and subsequent cycles are all identical in all respects with the cycle described except for the period during which the elevator rack remains in the lowered position. This period, although not necessarily different, is varied when desired by means of the arrangement of the leads from the selected deck (in this illustration deck 189) of the multi-deck relay 190 to said relay 193.

The unit cycle described, which includes advancing the carriage 25, lowering the elevator rack 96, agitating the support frame 123 for a specified, controlled period of time and then raising said support frame, is repeated for each tank and/or operation along the tank cabinet 10 where a stop block 58 is provided.

As the carriage 25 moves away from the last tank, or processing station, 16, the relay 177 is in position two. A switch actuation bar 59, which is secured to the rightward end of the rail 20, as appearing in Figure 1, engages and trips the toggle 62 on the mechanically actuated three-pole switch 61 which is secured to the casing 71 of the elevator 70 (Figure 4). The tripping of said switch 61 disconnects the middle row of terminals thereon from the lower row of terminals and connects said middle row with the upper row of terminals, as the terminals are indicated in Figure 14. The carriage driving motor 38, which is connected to the lower terminal of the first pole of the switch 61, is disconnected and the carriage stops. The photographically sensitized materials, which are supported upon said carriage, may now be removed as soon as the operator desires.

The reset coil 202 of the single deck relay 193, which coil is in a circuit with the upper terminal of the third pole 199 of said switch 61, is actuated when said switch 61 is tripped, as aforesaid, thereby returning the tank indicator arm 194 to the zero position on the relay 193. A "complete" cycle, as referred to in the claims has now been finished.

The wheeled carriage 25 may, if desired, be removed from the rail 20 and carried back to the leftward end of the rail 20, as appearing in Figure 1. However, if the toggle switch 201 (Figure 14) is manually tripped to the leftward, dotted line, position 201a, a circuit is established including the second pole 198 of the switch 61, the carriage driving motor 38, in reverse connection, and position two on the deck 179, and the motor 38, rotating in the opposite direction, moves the carriage back to said leftward end of the rail 20. The circuit including the switch 54 and the step coil 182 is opened at the third pole 199 of the switch 61. Therefore, closure of said switch 54 by the stop blocks 58, as the carriage 25 moves back along the rail 20, does not stop said carriage nor initiate any unit cycle.

When the carriage 25 reaches the leftward end of the rail 20, the toggle 62 of the switch 61 engages the switch actuation bar 60 and said switch is returned to its original position, as indicated in Figure 14. The circuit, including the second pole 198 of the switch 61, the carriage driving motor 38 and the deck 179 of the relay 177, is opened at the pole 198, thereby stopping the carriage driving motor. The carriage 25 is now ready for reloading and another operational trip along the rail 20 as hereinbefore described.

Each deck 189 of the multi-deck relay 190, which may represent a different program of timing, is electrically connected to as many positions on the single deck relay 193 as there are tanks and/or processing stations along the tank cabinet 10. Thus, although deck 189 was used illustratively in the above description of the operation of the invention, any one of the available decks, selected by the selector switch 192, may be utilized to program the timing of the elevator rack 96 while it is in the lowered position.

Although the above mentioned description and drawings apply to a particular, preferred embodiment of the invention, it is not our intention, implied or otherwise, to eliminate other variations or modifications which do not depart from the scope of the invention unless specifically stated to the contrary in the hereinafter appended claims.

I claim:

1. In a device for placing sensitized photographic materials successively into processing means at a plurality of stations, said stations constituting a plurality of tanks arranged in a row and having a side of each of said tanks substantially aligned with the corresponding sides of the others of said tanks, and the upper edges of said sides substantially aligned with each other, said sides and said upper edges consituting a side and an upper edge for said means, comprising in combination: a rail along said side of said means and below said upper edge thereof; a carriage mounted on and traversable along said rail and positioned substantially below the upper edge of said means; and means also positioned below the upper edge of said processing means r movably supporting said carriage on said rail for motion in both directions therealong a vertically extending rotatable screw mounted on said carriage and extending above said means; a frame for supporting said photographic materials, and means supported on said carriage supporting said frame for vertical sliding movement with respect to said carriage and driven by said screw for upward movement with respect to said carriage as said screw is rotated in one direction and for downward movement as said screw is rotated in the other direction said frame overhanging said processing means; a driving motor mounted on said carriage and means driven by said motor for driving said carriage along said rail, a second motor mounted on said carriage for driving said screw, means energizing said motors and independently controlling their operation at the will of an operator.

2. The invention defined in claim 1 wherein said carriage has an elongated casing depending below said rail, said screw being within said casing and said second motor being attached to said casing at its lowermost end for rotating said screw, and said frame including a rack vertically and slidably reciprocable within and upwardly out from said casing in response to rotation of said screw, a guide channel adjacent the lower most part of said casing mounted fixedly with respect to said tanks and a guide roller on said casing extending into said channel for preventing movement of said casing in a direction perpendicular to said guide channel.

3. In apparatus for the processing of photographic materials including a plurality of serially arranged means providing processing stations, said means including a plurality of tanks and said means having a substantially continuous side and said side having a substantially horizontal upper edge, the combination comprising: a track extending alongside of said means and below the upper edge of said means; a carriage on said track and movable therealong and having rack support means extending upwardly therefrom to a point above said means; a vertically movable rack on said rack support means and overhanging said processing stations; a hanger for supporting the photographic materials upon said rack in such position that when said rack is in its downward position said materials enter into one of said means and when said rack is in its upward position such materials are out of said means; an electric motor on said carriage and means associated therewith for moving the said carriage along said track; a second electric motor on said carriage and means connected therewith for effecting upward and downward movement of said rack; an electrical network, including timing means and connectable to a source of electrical energy, actuating the said motors for moving said photographic materials upwardly and downwardly and moving said carriage along said rail, all in a predetermined manner according to the will of an operator, said electrical network including a multiple step relay, one of whose steps is actuated by a switch, actuated in turn by movement of said carriage, which step initiates downward movement of said rack, another step actuated by downward movement of said rack which step initiates operation of said timing means, and another step actuated by said timing means for effecting upward movement of said rack to complete the cycle at a given station; whereby photographic materials can be lowered into one of said tanks, held there a predetermined length of time, removed and moved to another processing station in a predetermined manner.

4. In a photoprocessing device having a series of processing means including a plurality of tanks arranged substantially in a row and having a side of each of said tanks substantially aligned with the corresponding sides of the others of said tanks, and the upper edges of said sides aligned with each other, said sides and said upper edges of said tanks constituting a side and an upper edge for said means, the combination comprising: a rail arranged alongside of said means and having a cycle beginning portion and a cycle ending portion; switch tripping members arranged along said rail and respectively adjacent to each of said processing means; a guide channel paralleling said rail and positioned below same with its open side facing downwardly; a carriage supported on said rail for travel therealong and including a downwardly extending portion carrying a guide member received into said guide channel for preventing the lower end of said carriage from movement perpendicular with respect to said guide channel; a vertically movable rack slidably supported upon said carriage, extending upwardly therefrom and a support frame for supporting photographic materials to be processed, so positioned with respect to said processing means that in successive selected positions of said carriage on said rail said photographic materials may be successively placed into and withdrawn from said processing means by upward and downward movement of said rack; a pair of motors on said carriage; means connected with one motor for driving said carriage along said rail; means connected with the other motor for effecting movement of said support frame; electrical control means automatically actuating said motors in a predetermined manner for driving said carriage from the cycle beginning portion of said rail to the cycle ending portion of said rail with predetermined upward and downward movement of said rack for effecting predeterminable processing of said photographic materials; and means effecting automatic return of said carriage from said cycle ending portion of said rail to the cycle beginning portion of said rail without effecting upward and downward movement of said rack.

5. In a photoprocessing device having a series of processing means arranged substantially in a row, said means including a plurality of tanks and said means having a substantially continuous side and said side having a substantially horizontal upper edge the combination comprising: a rail arranged alongside of said means and below the upper edge thereof and having a cycle beginning portion and a cycle ending portion; switch tripping members arranged along said rail and respectively adjacent each of said processing means; a guide channel paralleling said rail and positioned below same with its open side facing downwardly; a carriage positioned substantially below said upper edge and supported on said rail for travel therealong and including a downwardly extending portion carrying a guide member received into said guide channel for preventing the lower end of said carriage from movement perpendicular with respect to said guide channel; an upwardly extending rack support on said carriage and a vertically movable rack slidably supported thereon; a support frame on said support rack for supporting photographic materials to be processed, so positioned with respect to said processing means that in successive selected positions of said carriage on said rail said photographic materials may be successively placed into and withdrawn from said processing means by upward and downward movement of said rack; a pair of motors on said carriage; means connected with one motor for driving said carriage along said rail; means connected with the other motor for effecting movement of said support frame; electrical control means automatically actuating said motors in a predetermined manner for driving said carriage from the cycle beginning portion of said rail to the cycle ending portion of said rail with predetermined upward and downward movement of said rack for effecting predeterminable processing of said photographic materials.

6. In a photoprocessing device having a series of lineally arranged processing stations said stations including a plurality of open top tanks arranged in a row and having the sides of each of said tanks substantially aligned with the corresponding sides of the others of said tanks, and the upper edges of said sides aligned with each other, said sides and said upper edges constituting a side and an upper edge for said series of stations, the combination comprising: a first rail arranged along said sides of said processing tanks and below the upper edges thereof; a second rail spaced below said first rail and arranged parallel therewith; a vertically elongated carriage supported near its upper end on the first rail and near is lower end on the second rail and bodily removable therefrom; a plurality of vertically upstanding rods extending from said carriage to a point above the upper edge of said processing tanks; a vertically arranged screw rotatably supported on said carriage and a first motor on the lower end of said carriage for rotating said screw; a second motor on said carriage and means associated therewith and with one of said rails for driving said carriage along said rails; a member guided by said rods for vertical sliding movement thereon, engaged by said screw for raising or lowering as said screw rotates in one direction or the other and overhanging said processing stations; one switch on said carriage and switch initiating blocks along one of said rails; another switch on said carriage and means operating same as said member moves up and down; an electrical network initiated by said switches to actuate said motors and cause photographic materials supported on said member to progress through a predetermined sequence of operations with respect to said processing stations.

DOUGLAS R. NEWTON.
RAYMOND W. NILES.

REFERENCES CITED

The following references are of record in the file of this patent:

UNITED STATES PATENTS

| Number | Name | Date |
| --- | --- | --- |
| 1,233,109 | Nesbit | July 10, 1917 |
| 1,254,300 | Baker | Jan. 22, 1918 |
| 2,194,345 | Winans | Mar. 19, 1940 |
| 2,325,120 | Forse | July 27, 1943 |